United States Patent
Nazirudeen et al.

(10) Patent No.: US 11,689,774 B2
(45) Date of Patent: Jun. 27, 2023

(54) SMART AV RECEIVER FOR CONTENT PROTECTION

(71) Applicant: Microsoft Technology Licensing, LLC, Redmond, WA (US)

(72) Inventors: Ashif Nazirudeen, Redmond, WA (US); Mike Nakahara, Kirkland, WA (US); Allan Christopher Ecker, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/235,600

(22) Filed: Apr. 20, 2021

(65) Prior Publication Data

US 2022/0224987 A1 Jul. 14, 2022

Related U.S. Application Data

(60) Provisional application No. 63/136,285, filed on Jan. 12, 2021.

(51) Int. Cl.
*H04N 21/485* (2011.01)
*H04N 21/443* (2011.01)
*H04N 21/454* (2011.01)
*H04N 5/44* (2011.01)

(52) U.S. Cl.
CPC ............. *H04N 21/485* (2013.01); *H04N 5/44* (2013.01); *H04N 21/4438* (2013.01); *H04N 21/454* (2013.01)

(58) Field of Classification Search
CPC .......... H04N 21/4181; H04N 21/4367; H04N 21/2187; H04N 21/2347; H04N 21/4316; H04N 21/4405; H04N 21/47; H04N 21/6125; H04N 5/45; H04N 7/185; H04N 7/147

See application file for complete search history.

(56) References Cited

U.S. PATENT DOCUMENTS

| 6,216,228 | B1 | 4/2001 | Chapman et al. |
| 8,046,586 | B1 | 10/2011 | Wyatt et al. |
| 8,681,977 | B2 | 3/2014 | Velasco et al. |

(Continued)

FOREIGN PATENT DOCUMENTS

KR 200380663 Y1 4/2005

OTHER PUBLICATIONS

"Takes a Fresh Look at HDCP", https://theartofservice.com/takes-a-fresh-look-at-hdcp.html, Retrieved on: Dec. 24, 2020, 13 Pages.

(Continued)

*Primary Examiner* — Samira Monshi
(74) *Attorney, Agent, or Firm* — Holzer Patel Drennan (57) ABSTRACT

An audio/video (AV) receiver is adapted to be dynamically reconfigured in a selected one of an encrypted content support mode and an unencrypted content support mode. The AV receiver includes a controller configured to dynamically alter one or more encryption settings based at least in part on user input provided to a mode toggle mechanism. The one or more altered encryption settings are effective to facilitate presentation of unencrypted content within a received media stream on a display while selectively preventing presentation of encrypted content included in the received media stream on the display.

20 Claims, 4 Drawing Sheets (56) References Cited

U.S. PATENT DOCUMENTS

| | | |
|---|---|---|
| 8,930,692 B2 | 1/2015 | Altmann |
| 9,565,176 B2 | 2/2017 | Goyal |
| 10,212,460 B1* | 2/2019 | Dorwin ............... H04L 65/4092 |
| 2007/0110226 A1 | 5/2007 | Ogata |
| 2008/0092246 A1* | 4/2008 | Shintani ............. H04N 21/4122 |
| | | 726/30 |
| 2009/0287651 A1* | 11/2009 | Stapleton .............. G06F 40/106 |
| 2011/0075682 A1 | 3/2011 | Altmann |
| 2011/0206349 A1 | 8/2011 | Schultz et al. |
| 2014/0052873 A1 | 2/2014 | Watson et al. |

OTHER PUBLICATIONS

"What You Need to Know About Video Encryption", https://inplayer.com/video-encryption/#:~:text=Video%20encryption%20is%20a%20process,videos%20without%20first%20decoding%20them, Retrieved on: Dec. 24, 2020, 5 Pages.

"High-bandwidth Digital Content Protection System Mapping HDCP to HDMI", Retrieved from: https://www.digital-cp.com/sites/default/files/specifications/HDCP%20on%20HDMI%20Specification%20Rev2_2_Final1.pdf, Feb. 13, 2013, 72 Pages.

"International Search Report and Written Opinion Issued in PCT Application No. PCT/US21/061052", dated Feb. 25, 2022, 11 Pages.

* cited by examiner

SMART AV RECEIVER FOR CONTENT PROTECTION

CROSS-REFERENCE TO RELATED APPLICATIONS

The present application claims priority to U.S. provisional application no. 63/136,285, entitled "Smart AV Receiver for Content Protection" and filed on Jan. 12, 2021, which is hereby incorporated by reference for all that it discloses or teaches.

BACKGROUND

High-bandwidth Digital Content Protection (HDCP) is a form of digital copy protection designed to prevent copying of digital audio and video content as it travels across connections. Video streaming content providers commonly use HDCP to encrypt outgoing content. Before sending data encrypted using HDCP technology, a transmitting device (e.g., a set-top box, Blu-ray Player, computer video card) may check that the receiver, also called a "sink" (e.g., the device that renders the content for display) is authorized to receive it. For example, the sink device may be a TV or digital projector. When it is determined that the receiving device is authorized to receive the data, the transmitter encrypts the data to prevent eavesdropping as it flows to the receiver.

SUMMARY

According to one implementation, an audio/video sink device includes a mode toggle mechanism that receives user input for dynamically selecting between an encrypted content support mode and an unencrypted content support mode. The A/V sink device further includes a controller configured to dynamically alters one or more encryption settings based at least in part on receiving the user input and without rebooting the AV sink device. The one or more altered encryption settings are effective to facilitate presentation of unencrypted content within a received media stream on a display while selectively preventing encrypted content included in the received media stream from being presented on the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

In devices relying on HDCP technology, adequate content protection depends on the ability of a transmitting device to accurately infer whether the receiving device is configured to support the currently-selected HDCP encryption level.

In some jurisdictions, regulatory schemes prohibit certain actions on content that has been encrypted using HDCP technology. For example, it may be illegal in some jurisdictions for an application to splice HDCP-protected content together with other application content prior to displaying the content. Consequently, some AV devices implement logic prohibiting specific/predefined actions on content that is known to be encrypted.

Notably, there exist scenarios when it may be desirable for an AV receiver to be capable of conditionally performing some actions that are generally prohibited on HDCP-protected content. For example, a user may want to broadcast a self-generated media file of a presentation including voice content generated by a first application (e.g., a voice recorder) and visual content generated by a second application (e.g., power point slides). Although this splicing together of content generated by multiple applications may be prohibited in cases where either the audio or the visual content is HDCP-protected content, these actions are perfectly legal in the above example where none of the content spliced stream is HDCP-protected content.

To provide support for actions such that that described above on content that is not subject to HDCP protection, AV receivers may be designed to support "unencrypted" content (e.g., non-compliant with HDCP protocols) or, alternatively, have multiple user-selectable modes of operation. For example, an AV receiver may have a user-selectable setting that toggles the device between an "encrypted data mode" (e.g., HDCP-compliant mode supporting encryption) and an "unencrypted data mode" (e.g., a non-HDCP-compliant mode that does not support encryption). These existing systems typically require a "reboot" of one or both the source and receiving devices to toggle between selectable modes of operation, and the devices may be configured to exchange current encryption mode settings during a power-on "hand-shake." If an AV receiving device were to dynamically switch from an encrypted mode to an unencrypted mode without a reboot, encrypted content may continue to be streamed, received, and presented (e.g., since these devices typically are configured to automatically decrypt and presented upon receipt, regardless of mode). This presents vulnerabilities for exploiting and/or mishandling the data.

The aforementioned security vulnerabilities are reduced or eliminated when it can be guaranteed that the AV source is able to accurately determine whether an AV receiver is currently operating in an encrypted data mode or an unencrypted data mode. However, many existing current systems may lack this capability. The herein disclosed technology provides security and data management solutions that guarantee HDCP-encrypted content is not inadvertently rendered to a display by a receiving device operating in a non-compliant encryption mode (e.g., a mode that does not support HDCP encryption).

Figure 1:
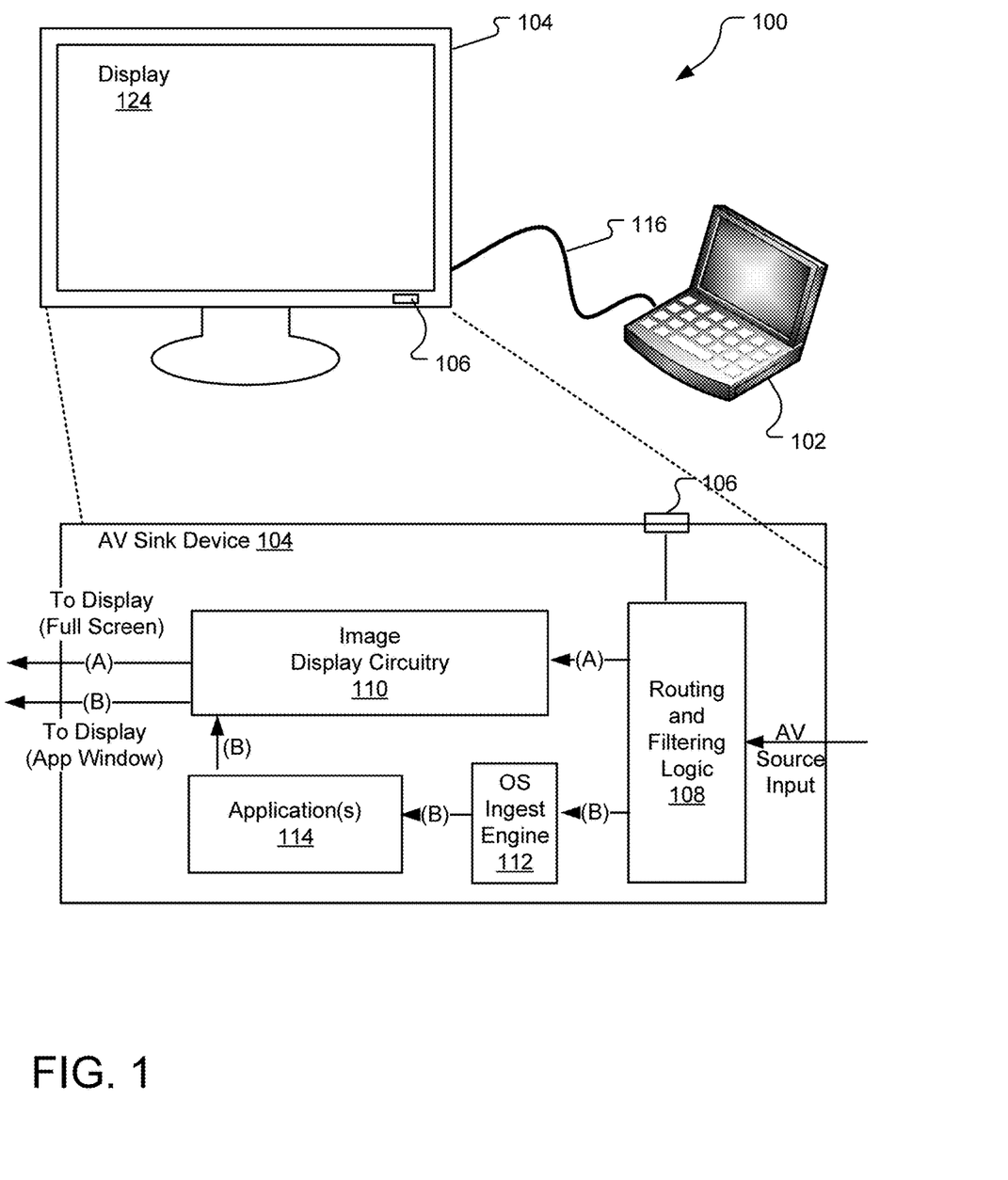
FIG. 1 illustrates an example system that includes an AV receiver with smart features designed to prevent mismanagement of encrypted media content.

FIG. 1 illustrates an example system 100 that includes an AV sink device 104 with smart features designed to prevent mismanagement of HDCP-protected content. The example system 100 includes an audio/video (AV) source device 102

(e.g., a host device) that acts as an AV source by transmitting a media stream (e.g., video and/or audio) to the AV sink device 104, such as along a wired or wireless network connection (e.g., connection 116). In one implementation, the AV source device 102 includes an HDCP/HDMI transmitter (not shown) that is used to prepare and transmit content that is subject to HDCP encryptions as well as unencrypted content. Example host devices include without limitation set-top boxes, DVD players, Blu-ray players, media streaming devices (e.g., Apple TV®, Chrome cast®, and Roku®), gaming devices such as Xbox®, and video recording devices that offer direct playback features such as laptops, camcorders, digital cameras, tablets, and smart phones.

The AV sink device 104, in contrast, includes components that render digital content to a display 124 so that the content can be viewed. In one implementation, the AV sink device 104 includes one or more HDCP/HDMI receivers. Example AV sink devices (e.g., receivers) include without limitation TVs and digital projectors.

The AV sink device 104 includes a user-selectable mode toggle mechanism 106 (e.g., a button, switch, or other input mechanism) that permits a user to manually provide input to dynamically reconfigure the AV sink device 104 in one of two selectable content modes—(1) an encrypted content support mode and (2) and an unencrypted content support mode. This reconfiguration is achieved without rebooting or otherwise interrupting the connection between the AV sink device 104 and the AV source device 102, and while implementing safeguards to prevent mishandling of encrypted content that may be inadvertently received when the AV sink device 104 is operating in the unencrypted content support mode.

In some existing AV systems, a content support mode 'check' is performed during a handshake sequence that occurs when the two devices are initially coupled. When, for example, a user plugs in a cable to complete the coupling between the AV source device 102 and the AV sink device 104, the two devices conduct a handshake sequence to determine various information such as device identity, relevant device settings, and to establish bidirectional communications. During this handshake, the AV source device 102 may determine a current encryption setting of the AV sink device 104 and selectively self-configure to transmit data in a compatible mode. If, for example, the AV sink device 104 indicates that it is configured to operate in an unencrypted mode, the AV source device 102 may self-configure in accord with predefined settings, such as a setting that reduces resolution of an outgoing video streams (e.g., to discourage copyright piracy), prevents transmission of HDCP-protected content, etc. These existing systems that rely on handshake data in this way typically lack consistent and/or effective safeguards to prevent mismanagement of encrypted data in scenarios where mode changes occur after the initial host/receiver handshake. If, for example, the AV sink device 104 is dynamically toggled from an encrypted content support mode to an unencrypted content support mode after the initial device-to-device handshake, there exists a risk that the AV source device 102 may not detect the mode change and may therefore continue to flow encrypted data to the AV sink device 104. In these systems, the AV sink device 104 may automatically decrypt any content recognized as HDCP-encrypted and present such content to the display 124, regardless of the currently-supported content mode.

The system 100 eliminates the foregoing security vulnerabilities and regulatory non-compliance risks by including features within the AV sink device 104 that guarantee that encrypted content may not be rendered to the display 124 at any time when the AV sink device 104 is operating in an unencrypted (e.g., non-HDCP compliant) content support mode. Specifically, the AV sink device 104 of FIG. 1 includes routing and filtering logic 108 that enforces HDCP content protections by routing the incoming media stream along a select one of two different physical paths (A or B, respectively) depending upon which one of the two selectable content modes the AV sink device 104 is currently configured to support.

When a user provides input to the mode toggle mechanism 106 to selectively reconfigure the AV sink device 104 for operation in the encrypted content support mode, the routing and filtering logic 108 directs the incoming media stream along a first data path "A" while blocking a second data path "B." The data path A directs the media stream to image display circuitry 110 that, in turn, presents the content of the media stream on the display 124. In one implementation, the image display circuitry 110 includes components the same or similar to an AV sink in a traditional TV or monitor lacking "smart" features. For example, the image display circuitry 110 is configured to display media content, without altering or storing such content. In one implementation, the image display circuitry 110 lacks a processor.

Since the media stream traveling along data path A is not input to a local operating system, content traveling along this path remains inaccessible to application(s) 114 installed on the AV sink device 104. Consequently, configuration of the AV sink device 104 in the unencrypted content support mode causes content of the media stream to be presented in a full-screen mode on the display 124 rather than within an application window that is locally generated by the AV sink device 104.

Notably, data path A may be used to transmit and actively present either HDCP-protected content (encrypted content) or non-HDCP content (unencrypted content) in the full-screen display mode. This is because selection of the encrypted content support mode does not prohibit presentation of unencrypted content; rather, selection of the encrypted content support mode merely ensures that all incoming media content is subjected to HDCP-compliant data handling protections.

When a user provides input to the mode toggle mechanism 106 to dynamically reconfigure the AV sink device 104 for operation in the unencrypted content support mode, the routing and filtering logic 108 directs the incoming media stream along a second data path "B" to an operating system (OS) ingest engine 112. The OS ingest engine 112 ingests the incoming media stream into memory locations accessible by one or more locally installed applications 114. In this manner, the media stream content is made accessible to locally-executing application(s) that may, in turn, control a graphics pipeline (not shown) to spawn an application window, populate the application window with content of the media stream, and further control image display circuitry 110 to present the populated application window on the display 124.

By providing input the mode toggle mechanism 106 to select data path B, the user is indicating a desire to make the incoming media content accessible to local applications such that the media content may be potentially manipulated by such applications (e.g., spliced with user-generated non-HDCP content) prior to presentation on the display. Content traveling along data path B may therefore be understood as likely to be subjected to various actions that may be jurisdictionally impermissible for HDCP-protected content.

In one implementation, the AV sink device 104 actively advertises mode changes effected through the mode toggle mechanism 106 to the AV source device 102. If, for example, a user provides input to toggle the AV sink device 104 from the encrypted support mode (utilizing data path A) to the unencrypted content support mode (utilizing data path B), the AV sink device 104 may then transmit a message to notify the AV source device 102 that the AV sink device 104 is operating in the unencrypted content support mode. Based at least in part on the receipt of such advertisement, the AV source device 102 may acknowledge the advertisement in various ways, such as by transmitting a response or taking a predefined action, such as terminating transmission of the media content stream or lowering resolution of the stream.

In one implementation, the routing and filtering logic 108 executes logic to selectively block media content from reaching the image display circuitry 110 when the AV source device 102 fails to acknowledge a mode change advertisement within a predefined time interval. If, for example, the user toggles the AV receiver into the unencrypted content support mode (selecting data path B), the routing and filtering logic 108 may advertise mode change and/or block any incoming content that is recognizable as HDCP-protected content. In one implementation, the routing and filtering logic 108 advertises the mode change (from encrypted to unencrypted) to the AV source device 102 and, if the AV source device 102 does not respond to the advertisement within a set time-out interval, the routing and filtering logic 108 enacts a filter to block encrypted content from being transmitting to the display 124. For example, the routing and filtering logic 108 may examine a flag present within the incoming media stream to determine whether the incoming media content is HDCP-protected. Upon determining that the incoming content is HDCP-protected content (encrypted) the routing and filtering logic 108 prevents (blocks) the incoming content from traveling down the selected data path (e.g., data path B).

Notably, the dynamic toggling of the AV sink device 104 between the encrypted content support mode (utilizing data path A) or the unencrypted content support mode (utilizing data path B) may be fully affected without disrupting a connection between AV source device 102 and the AV sink device 104. That is, neither device nor respective components within the device need to be rebooted when the content support mode is toggled from the encrypted content support mode to the unencrypted content support mode, or vice versa. This allows for an uninterrupted user experience and a seamless transition between the two modes.

In the above-described manner, the disclosed AV sink device 104 is dynamically reconfigurable in either an encrypted content support mode that ensures compliance with HDCP protections or in an unencrypted content support mode that facilitates (permits) actions on content that would be forbidden under certain jurisdictionally-imposed HDCP protection schemes. When the AV sink device 104 is configured in the unencrypted support mode, the routing and filtering logic 108 may selectively enact unilateral safeguards to prevent any encrypted (HDCP-protected) content that inadvertently reaches the AV sink device 104 from being rendered to the display.

Figure 2:
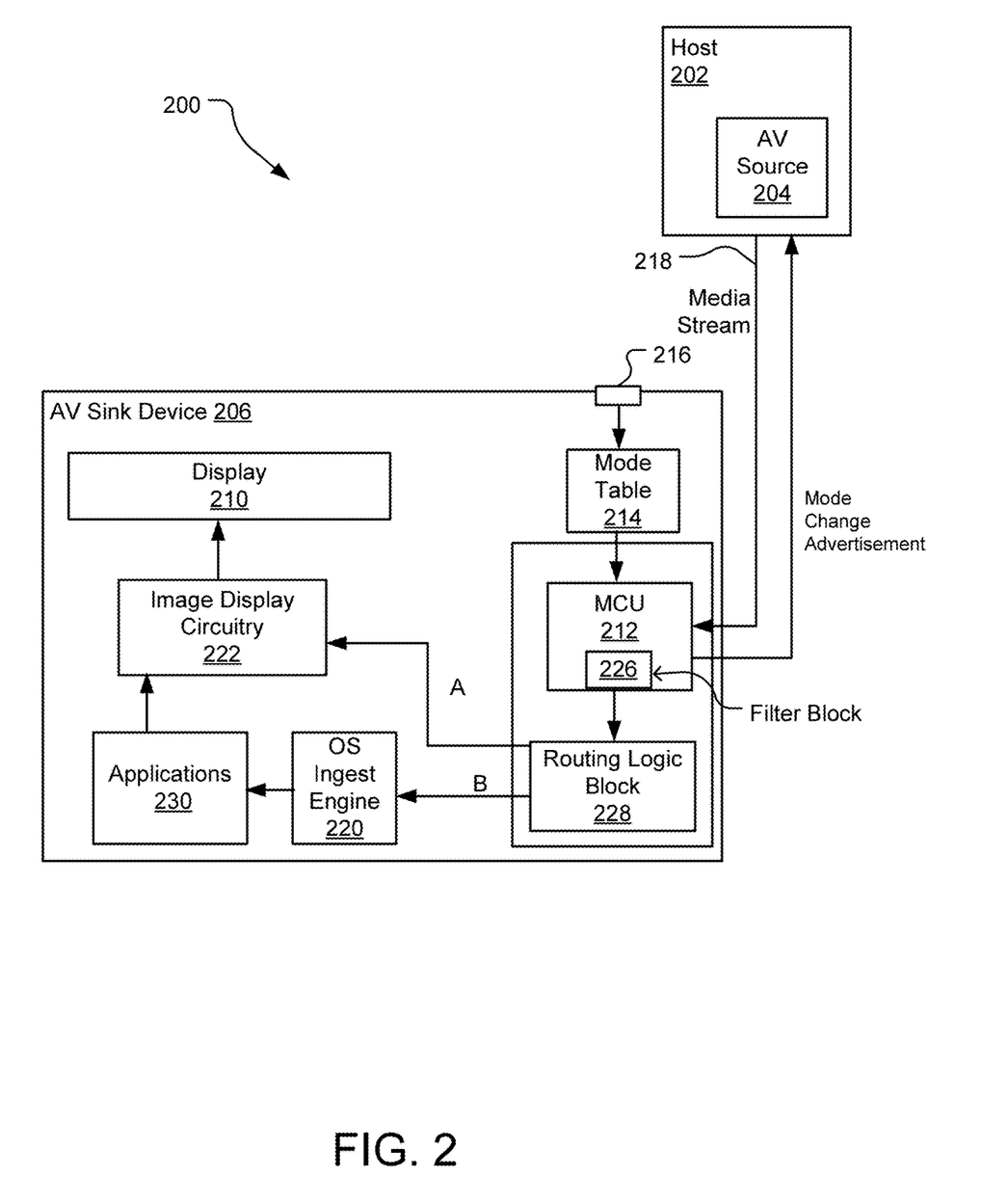
FIG. 2 illustrates another example system that includes an AV sink device with smart features designed to prevent mismanagement of encrypted content.

FIG. 2 illustrates another example system 200 that includes an AV sink device 206 with smart features designed to prevent mismanagement of HDCP-protected content. The example system 200 includes a host device 202 that includes an AV source 204 that transmits a media stream 218 (e.g., video and/or audio) to the AV sink device 206.

The AV sink device 206 is shown to include several components the same or similar to those shown in FIG. 1 including, for example, a display 210, image display circuitry 222, OS ingest engine 220, and application(s) 230 executed by a local operating system. In some implementations, the display 210 is not integrally attached to the AV sink device 206 and is instead coupled to the AV sink device 206 via a wired or wireless connection. In some implementations, the host device 202 is physically coupled to the AV sink device 206 by cable connection, such as HDMI. In other implementations, the media stream 218 is transmitted wirelessly between the host device 202 and the AV sink device 206.

Depending on the type of content included in the media stream 218, the media stream 218 may or not be encrypted using HDCP protocols. If, for example, the host device 202 is a laptop computer and the media stream 218 includes user-generated content (e.g., a word document or a slide deck), the media stream 218 may be unencrypted and not subject to HDCP-protection protocols. Alternatively, the AV source device 202 may, in some scenarios, provide the AV sink device 206 with copyright-protected multimedia content such as television or movie content that is either locally stored on the AV source device 102 or streamed from a cloud-based media server. Notably, media content providers such as Netflix® or Amazon® may desire or require HDCP encryption of all media content that is stored and streamed to end users. Notably, certain host-executed applications may also be configured to exclusively transmit unencrypted content to avoid running afoul of certain jurisdictional regulations, such as those prohibiting splicing of content that is subject to HDCP protections.

To accommodate rendering of various types of both encrypted and unencrypted content, the AV sink device 206 includes a mode toggle mechanism 216 that enables selective toggling of the AV sink device 206 between an encrypted content support mode and an unencrypted content support mode. The mode toggle mechanism 216 may, for example, function in a same or similar manner as that described above with respect to FIG. 1.

In some implementations, the mode toggle mechanism 216 is selectable by a user via menu or settings of the AV sink device 104. For example, a user may toggle between the encrypted data mode and the unencrypted data mode by pushing a button, sliding a switch, by providing touchscreen or other input. Each time the mode toggle mechanism 216 is engaged to alter the currently-supported content mode of the AV sink device 206, a mode table 214 is updated to reflect the change. When in operating in an encrypted content support mode, the AV sink device 204 does not store or alter content in the media stream. While in the unencrypted content support mode an incoming media stream may be stored and/or altered before being presented on the display 210.

The AV sink device 206 includes a micro-control unit (MCU 212) that performs various security actions to ensure that encrypted (HDCP-protected) content in the media stream 218 is not inadvertently mishandled if received when the AV sink device 206 is configured to operate in the unencrypted content support mode. In one implementation, the MCU 212 periodically retrieves an encryption setting (e.g., current content support mode) of the AV sink device 206 from the mode table 214. For example, the MCU 212 may query the mode table 214 once per second, once per millisecond, or at a frequency matching a frame rate of the media stream 218. If the retrieved content mode is one that does not guarantee HDCP-compliant handling of the media stream 218, the MCU 212 takes one or more additional actions to prevent mishandling of any HDCP-protected content inadvertently received within the media stream 218.

In one implementation, the MCU 212 transmits a mode change advertisement to the host device 202 each time the mode table 214 indicates there has been a change in the content mode setting. In response, the host device 202 may acknowledge the advertisement via appropriate response or by some remedial action such as to (1) stop transmitting the media stream 218; (2) send an unencrypted, lower-resolution version of the media stream 218 (e.g., as may be specified by settings of a content owner or media server); or other predefined action.

Notably, some host devices may be ill-equipped to adequately respond to notifications of content mode change settings from the AV sink device 206, such as due to configuration vulnerabilities, inconsistent device standards, etc. Thus, there exist scenarios where the host device 202 may, for various reasons, continue to broadcast encrypted content in the media stream 218 despite receiving an advertisement from the AV sink device 206 indicating that encrypted content is not currently being supported. To ensure adequate, secure handling of encrypted content in this aforementioned scenario, the MCU 212 includes a filter block 226 adapted to selectively "block" incoming encrypted content under certain conditions, such as when encrypted content is received at times when the mode table 214 indicates that the AV sink device 206 is operating in an unencrypted content support mode. In one implementation, the filter block 226 samples data from the media stream 218 to determine whether an encryption setting of the AV source 204 matches a corresponding encryption setting of the AV sink device 206. If, for example, the AV source 204 is operating in an encrypted content support mode, the data of the media stream 218 may include a flag indicative of encryption. When the incoming content is encrypted and the mode table 214 indicates that the AV sink device 206 is operating in the unencrypted support mode, the filter block 226 blocks the incoming media stream such that the stream does not reach routing logic block 228, shown in FIG. 2, and described below.

In some implementations, the MCU 212 selectively performs the above-described security assurances (e.g., selective blocking of content) based at least in part on determining that the host device 202 has failed to acknowledge a mode change advertisement transmitted by the MCU 212 within a predefined timeout interval, such as a few seconds. In other implementations, the above-described selective blocking of encrypted content is performed automatically when a mismatch is detected between the currently-supported content mode (encrypted or unencrypted) of the AV sink device 206 and the AV source 204.

In instances when the filter block 226 is enacted to selectively block incoming encrypted content, the selective blocking may be undone (reversed, permitting transmission/ display of encrypted content) once the MCU 212 determines that the encryption setting of the AV source 204 again matches the encryption setting reflected in mode table 214 of the AV sink device 206.

Consistent with the routing actions described with respect to FIG. 1, the routing logic block 228 selectively routes data of the media stream 218 along one of two different selectable data paths within the AV sink device 206 depending upon the encryption setting shown in the mode table 214 at any given point in time. When the mode table 214 indicates that the AV sink device is configured in an unencrypted content support mode, the routing logic block 228 routes the media stream 218 along path B, into an OS ingest engine 220 to be accessed by one or more applications 230 and rendered, via a processor (not shown) and image display circuitry 222 to an application window on the display. When, in contrast, the mode table 214 indicates that the AV sink device 206 is configured in an encrypted content support mode, the routing logic block 228 routes the media stream 218 along data path A to the image display circuitry 222, bypassing the OS ingest engine 220 and thereby ensuring that the media stream 218 is not made accessible to the application(s) locally executing on the AV sink device 206. Data handled along path A is presented in full-screen mode on the display and not to an application window.

Figure 3:
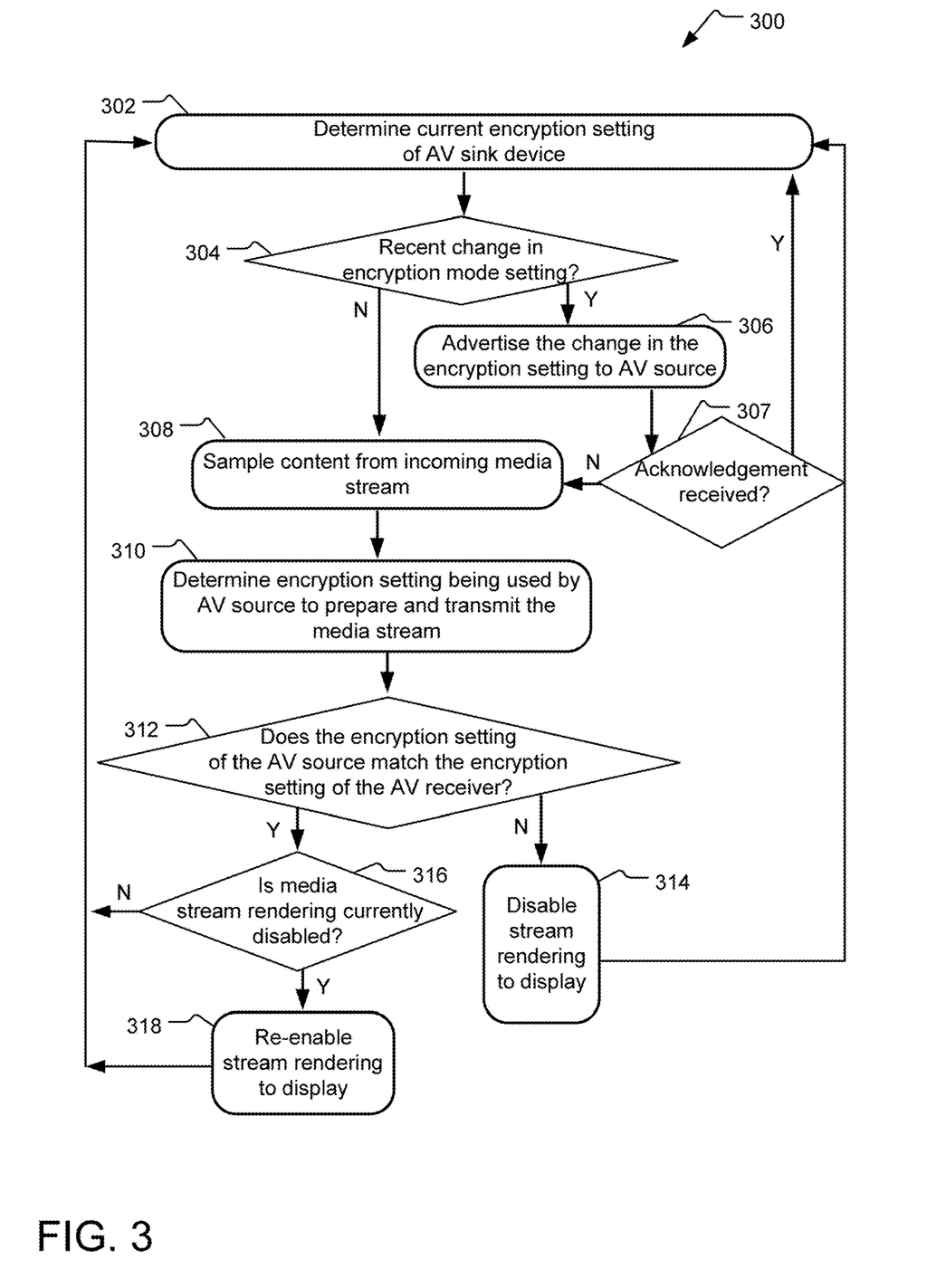
FIG. 3 illustrates example operations for operating a dual-mode AV system that is configurable to dynamically toggle between encrypted and unencrypted content support modes while implementing safeguards to prevent data mishandling.

FIG. 3 illustrates example operations 300 for operating a dual-mode AV system that is configurable to dynamically toggle between encrypted and unencrypted content support modes while implementing safeguards to prevent data mishandling. The operations 300 are, in one implementation, performed by an AV sink device based at least in part on (e.g., responsive to) determining that a user has toggled device settings from an encrypted content support mode to an unencrypted content support mode. A setting retrieval operation 302 determines a current encryption setting of the AV sink device, such as by looking up a current operational mode (e.g., encryption mode) in a local table. A determining operation 304 determines whether there has been a recent change in the encryption mode setting. For example, the determining operation 304 may determine whether the retrieved encryption setting has altered since a last query was placed to a table storing such information.

If there has been a change in the encryption setting (e.g., from a mode that supports encryption to a mode that does not support encryption), an advertising operation 306 advertises the change in the encryption setting to an AV source, such as by transmitting a notification that indicates the AV sink device is no longer supporting encrypted data. This advertisement explicitly notifies the AV source of the change in the encryption setting. Therefore, if the AV source lacks the technology to detect such a change (e.g., does not query for such information at frequent intervals), the AV source still receives the notification of the encryption setting change and may implement logic to ensure that encrypted content is not inadvertently transmitted to the receiver when the AV receiver is configured in a mode that does not support encryption.

A determination operation 307 determines whether the AV source has acknowledged the advertisement sent by the advertising operation 306. If so, the operations 300 repeat, beginning with the setting retrieval operation 302. If, however, the AV source fails to acknowledge the advertisement (such as by responding or by altering aspects of an outgoing media stream), the operations 300 proceed to a sampling operation 308 that samples content within the media stream that is currently being received from the AV source. An analysis and determination operation 310 analyzes the sampled data to determine an encryption mode setting that the AV source has been used to prepare the media stream prior to transmission. For example, the analysis and determination operation 310 may determine that the AV source is operating in an encrypted mode if the sampled data is encrypted or in an unencrypted mode if the sampled data is unencrypted.

Another determination operation 312 determines whether the determined encryption setting of the AV source matches the current encryption setting of the AV receiver. For example, the determination operation 312 determines whether both devices are operating in an encrypted mode or not. If there is a mismatch between the determined encryption setting of the AV source and the current encryption setting of the AV receiver, a stream interrupt operation 314 stops transmitting the media stream to a display. For example, the stream interrupt operation 314 may be performed when it is determined that the AV source is operating in an encrypted data mode (e.g., the media stream is encrypted) while the AV receiver is operating a mode that does not support encrypted data. In this case, the operations 300 loop back to again repeat the setting retrieval operation 302.

If the determination operation 312 determines that the determined encryption setting of AV source matches the current encryption setting of the AV receiver, the operations 300 proceed to another determining operation 316 that determines whether stream rendering is currently disabled (e.g., as may be the case if there previously existed a mismatch in the encryption settings of the AV receiver and the AV source). If the stream rendering is currently disabled, an enabling operation 318 re-enables stream rendering such that the AV receiver may again begin rendering the media stream and presenting the content on the display. Regardless of the whether or not the determining operation 316 determines that stream rendering is disabled, the operations 300 proceed to loop back and again repeat the setting retrieval operation 302.

Figure 4:
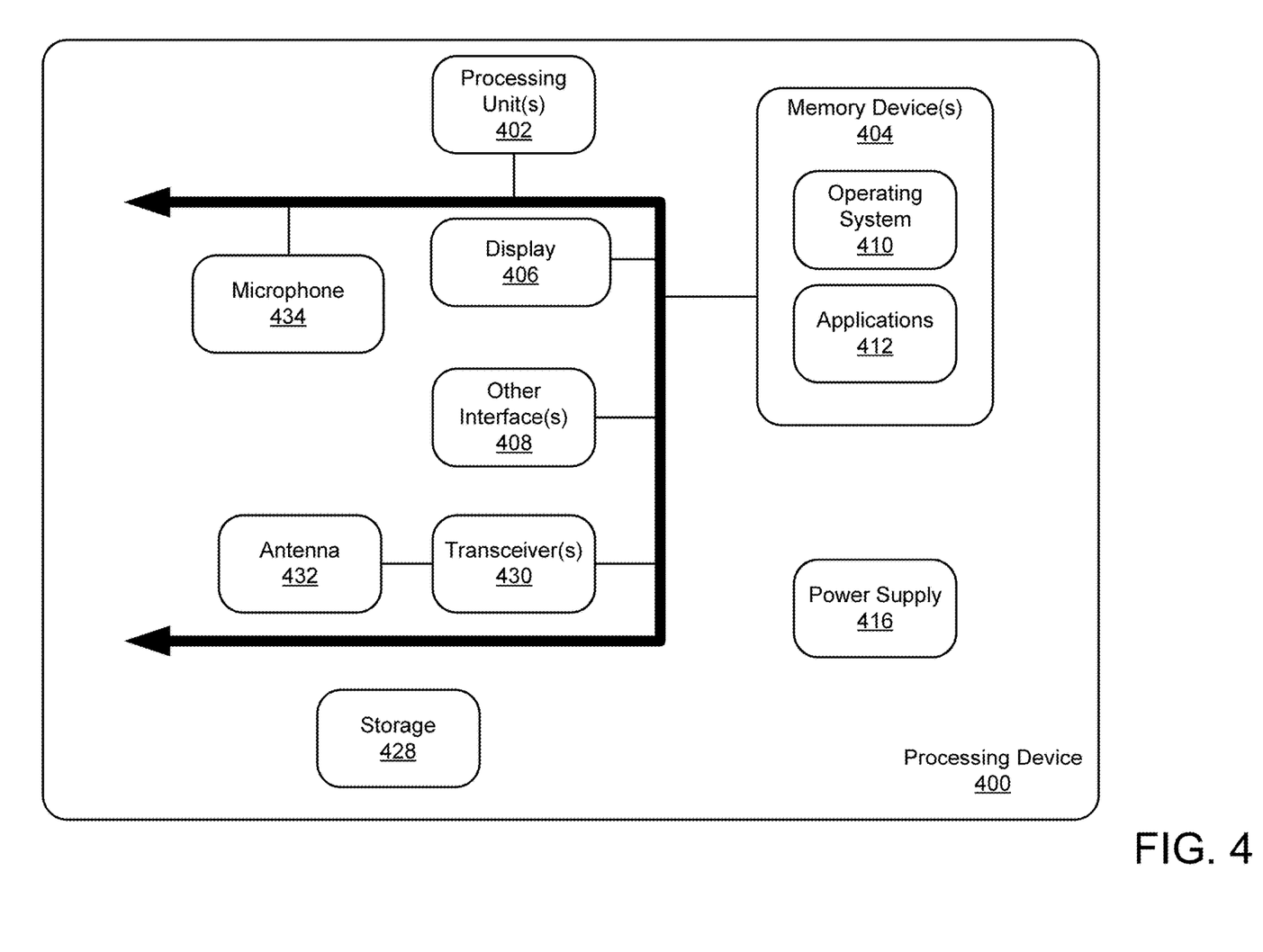
FIG. 4 illustrates an example schematic of a processing device that may be used in a system implementing the disclosed technology.

FIG. 4 illustrates an example schematic of a processing device 400 (e.g., an AV source device or AV sink device) that may be used in a system implementing the disclosed technology. The processing device 400 includes one or more processing unit(s) 402 and one or more memory devices 404 that may be incorporated anywhere within the processing device 400. Additionally, the processing device 400 includes a display 406, and other interfaces 408 (e.g., buttons). The memory devices 404 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, resides in the memory devices 404 and is executed by the processing unit(s) 402, although other operating systems may be employed.

One or more applications 412, such as encryption or decryption applications or firmware logic for conducting source/receiver handshakes and other communications may be loaded in the memory device(s) 404, which is accessible to the processing unit(s) 402. The processing device 340 further includes a power supply 416, which may be powered by one or more batteries and/or other power sources. The processing device 400 additionally includes one or more communication transceivers 430 and an antenna 432 to provide network connectivity (e.g., a mobile phone network, Wi-Fi®, Bluetooth®). The processing device 400 may also include various other components, such as user input interfaces (e.g., one or more buttons, cameras, an audio interface (e.g., a microphone 434, an audio amplifier and speaker and/or audio jack), as well as other storage devices 428. Other configurations may also be employed.

In an example implementation, logic of a smart AV receiver (e.g., an AV sink device 104 or 206) is embodied by instructions stored in memory device(s) 404 and/or storage devices 428 and processed by the processing unit(s) 402. The memory device(s) 404 may include memory of host device or of an accessory that couples to a host.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example system disclosed herein includes an audio/video (AV) sink device that includes a mode toggle mechanism and a controller. The mode toggle mechanism is configured to receive user input for dynamically selecting between an encrypted content support mode and an unencrypted content support mode, while the controller is configured to dynamically alter one or more encryption settings of an AV sink device based at least in part on receiving the user input and without rebooting the AV sink device. The one or more altered encryption settings facilitate presentation of unencrypted content within a received media stream on a display while selectively preventing presentation of encrypted content included in the received media stream on the display.

In an example system of any preceding system, the AV sink device is further configured to alter a selected path for data of the received media stream within the AV sink device based at least in part on receipt of the user input.

In yet another example system of any preceding system, the AV sink device is further configured to display content of the received media stream in a full screen display mode when the encrypted content support mode is selected and to display content of the received media stream in an application window presented on the display when the unencrypted content support mode is selected.

In still yet another example system of any preceding system, the AV sink device is further configured to advertise a mode change to an AV source device based at least in part on receipt of the user input and based at least in part on determining that the AV source device has failed to acknowledge the advertisement within a predefined timeout interval, block incoming media content that is encrypted from being rendered to the display.

In still yet another example system of any preceding system, the AV sink device is configured to detect and advertise the mode change during a time interval in which a coupling between the AV sink device and the AV source device remains uninterrupted.

In yet still another example system of any preceding system, the controller is further configured to determine a first encryption setting of the AV sink device based at least in part on receipt of the user input; analyze the received media stream received from the AV source device to determine a second encryption setting being used by an AV source device to prepare data of the received media stream for transmission to the AV sink device; and based at least in part on identifying a mismatch between the first encryption setting and the second encryption setting, block incoming content of the received media stream from being presented on the display.

In still yet another example system of any preceding system, the mode toggle mechanism is selected via user interaction with a physical button or switch.

An example method disclosed herein provides for receiving user input indicating a selection of one of an encrypted content support mode and an unencrypted content support mode; and dynamically altering one or more encryption settings of an AV sink device based at least in part on receiving the user input and without rebooting the AV sink device. The one or more altered encryption settings facilitating presentation of unencrypted content within a received media stream on a display while selectively preventing presentation of encrypted content included in the received media stream on the display.

According to another example method of any preceding method, the method further comprises altering a selected path for data of the received media stream within the AV sink device based at least in part on receiving the user input.

In yet still another example method of any preceding method, the method further comprises displaying content of the received media stream in a full screen display mode when the encrypted content support mode is selected; and displaying content of the received media stream in an application window presented on the display when the unencrypted content support mode is selected.

In still yet another example method of any preceding method, the method further comprises advertising a mode change to an AV source device based at least in part on receipt of the user input; and based at least in part on determining that the AV source device has failed to acknowledge the advertisement within a predefined timeout interval, blocking incoming media content that is encrypted from being rendered to the display.

In another example method of any preceding method, advertising the mode change further comprises detecting and advertising the mode change during a time interval in which a coupling between the AV sink device and the AV source device remains uninterrupted.

In another example method of any preceding method, the method further comprises determining a first encryption setting of an AV sink device based at least in part on receiving the user input; analyzing the received media stream received from the AV source device to determine a second encryption setting being used by the AV source device to prepare data of the received media stream for transmission to the AV sink device; and blocking incoming content of the received media stream from being presented on the display based at least in part on identifying a mismatch between the first encryption setting and the second encryption setting.

In another example method of any preceding method, the user input is provided via physical interaction with a button or switch.

An example system disclosed herein includes a means for receiving user input, the user input indicating a selection of one of an encrypted content support mode and an unencrypted content support mode. The system further comprises a means for dynamically altering one or more encryption settings of an AV sink device based at least in part on receiving the user input and without rebooting the AV sink device. The one or more altered encryption settings facilitating presentation of unencrypted content within a received media stream on a display while selectively preventing presentation of encrypted content included in the received media stream on the display.

An example tangible computer-readable storage media disclosed herein encodes computer-executable instructions for executing a computer process that comprises: receiving a user input indicating a selection of one of an encrypted content support mode and an unencrypted content support mode and dynamically altering one or more encryption settings of an AV sink device based at least in part on receiving the user input and without rebooting the AV sink device. The one or more altered encryption settings facilitate presentation of unencrypted content within a received media stream on a display while selectively preventing presentation of encrypted content included in the received media stream on the display.

In an example tangible computer-readable storage media of any preceding computer-readable storage media, the computer process further comprises altering a selected path for data of the received media stream within the AV sink device based at least in part on receiving the user input.

In still another example tangible computer-readable storage media of any preceding computer-readable storage media, the computer process further comprises displaying content of the received media stream in a full screen display mode when the encrypted content support mode is selected and displaying content of the received media stream in an application window presented on the display when the unencrypted content support mode is selected.

In yet still another example tangible computer-readable storage media of any preceding computer-readable storage media, the computer process further comprises advertising a mode change to an AV source device based at least in part on receipt of the user input; and based at least in part on determining that the AV source device has failed to acknowledge the advertisement within a predefined timeout interval, blocking incoming media content that is encrypted from being rendered to the display.

In another example tangible computer-readable storage media of any preceding computer-readable storage media, wherein advertising the mode change further comprises detecting and advertising the mode change during a time interval in which a coupling between the AV sink device and the AV source device remains uninterrupted.

In still another example tangible computer-readable storage media of any preceding computer-readable storage media, the computer process further comprises: determining a first encryption setting of the AV sink device; based at least in part on receiving the user input; analyzing the received media stream received from an AV source device to determine a second encryption setting being used by the AV source device to prepare data of the received media stream for transmission to the AV sink device; and blocking incoming content of the received media stream from being presented on the display based at least in part on identifying a mismatch between the first encryption setting and the second encryption setting.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A system comprising:
   an audio/video (AV) sink device including:
   a mode toggle mechanism configured to receive user input for dynamically selecting between an encrypted content support mode and an unencrypted content support mode; and
   a controller configured to:
      dynamically alter one or more encryption settings of an AV sink device to transition the AV sink device between the unencrypted content support mode and the encrypted content support mode based at least in part on receiving the user input and without rebooting the AV sink device;
      detect encrypted content within a received media stream while the AV sink device is operating in the unencrypted content support mode; and
      based at least in part upon the detection of the encrypted content received while the AV sink is operating in the unencrypted content support mode, selectively prevent presentation of the encrypted content included in the received media stream on a display.

2. The system of claim 1, wherein the AV sink device is further configured to:
   alter a selected path for data of the received media stream within the AV sink device based at least in part on receipt of the user input.

3. The system of claim 2, wherein the AV sink device is further configured to:
   display content of the received media stream in a full screen display mode when the encrypted content support mode is selected; and
   display content of the received media stream in an application window presented on the display when the unencrypted content support mode is selected.

4. The system of claim 1, wherein the AV sink device is further configured to:
   advertise a mode change to an AV source device based at least in part on receipt of the user input; and
   based at least in part on determining that the AV source device has failed to acknowledge the advertisement within a predefined timeout interval, block incoming media content that is encrypted from being rendered to the display.

5. The system of claim 4, wherein the AV sink device is configured to detect and advertise the mode change during a time interval in which a coupling between the AV sink device and the AV source device remains uninterrupted.

6. The system of claim 4, wherein the controller is further configured to:
   based at least in part on receipt of the user input, determine a first encryption setting of the AV sink device;
   analyze the received media stream received from the AV source device to determine a second encryption setting being used by an AV source device to prepare data of the received media stream for transmission to the AV sink device; and
   based at least in part on identifying a mismatch between the first encryption setting and the second encryption setting, block incoming content of the received media stream from being presented on the display.

7. The system of claim 1, wherein the mode toggle mechanism is selected via user interaction with a physical button or switch.

8. A method comprising:
   receiving user input indicating a selection of one of an encrypted content support mode and an unencrypted content support mode; and
   dynamically altering one or more encryption settings of an AV sink device to transition the AV sink device between the unencrypted content support mode and the encrypted content support mode based at least in part on receiving the user input and without rebooting the AV sink device;
   detecting encrypted content within a received media stream while the AV sink device is operating in the unencrypted content support mode; and
   based at least in part upon the detection of the encrypted content received while the AV sink is operating in the unencrypted content support mode, selectively preventing presentation of the encrypted content included in the received media stream on a display.

9. The method of claim 8, further comprising:
   altering a selected path for data of the received media stream within the AV sink device based at least in part on receiving the user input.

10. The method of claim 9, further comprising:
    displaying content of the received media stream in a full screen display mode when the encrypted content support mode is selected; and displaying content of the received media stream in an application window presented on the display when the unencrypted content support mode is selected.

11. The method of claim 8, further comprising:
advertising a mode change to an AV source device based at least in part on receipt of the user input; and
based at least in part on determining that the AV source device has failed to acknowledge the advertisement within a predefined timeout interval, blocking incoming media content that is encrypted from being rendered to the display.

12. The method of claim 11, wherein advertising the mode change further comprises detecting and advertising the mode change during a time interval in which a coupling between the AV sink device and the AV source device remains uninterrupted.

13. The method of claim 8, further comprising:
based at least in part on receiving the user input, determining a first encryption setting of an AV sink device;
analyzing the received media stream received from an AV source device to determine a second encryption setting being used by the AV source device to prepare data of the received media stream for transmission to the AV sink device; and
based at least in part on identifying a mismatch between the first encryption setting and the second encryption setting, blocking incoming content of the received media stream from being presented on the display.

14. The method of claim 8, wherein the user input is provided via physical interaction with a button or switch.

15. One or more tangible computer-readable storage media encoding computer-executable instructions for executing a computer process comprising:
receiving a user input indicating a selection of one of an encrypted content support mode and an unencrypted content support mode; and
dynamically altering one or more encryption settings of an AV sink device to transition the AV sink device between the unencrypted content support mode and the encrypted content support mode based at least in part on receiving the user input and without rebooting the AV sink device;
detecting encrypted content within a received media stream while the AV sink device is operating in the unencrypted content support mode; and
based at least in part upon the detection of the encrypted content received while the AV sink is operating in the unencrypted content support mode, selectively preventing presentation of the encrypted content included in the received media stream on a display.

16. The one or more tangible computer-readable storage media of claim 15, wherein the computer process further comprises:
altering a selected path for data of the received media stream within the AV sink device based at least in part on receiving the user input.

17. The one or more tangible computer-readable storage media of claim 16, wherein the computer process further comprises:
displaying content of the received media stream in a full screen display mode when the encrypted content support mode is selected; and
displaying content of the received media stream in an application window presented on the display when the unencrypted content support mode is selected.

18. The one or more tangible computer-readable storage media of claim 15, wherein the computer process further comprises:
advertising a mode change to an AV source device based at least in part on receipt of the user input; and
based at least in part on determining that the AV source device has failed to acknowledge the advertisement within a predefined timeout interval, blocking incoming media content that is encrypted from being rendered to the display.

19. The one or more tangible computer-readable storage media of claim 18, wherein advertising the mode change further comprises detecting and advertising the mode change during a time interval in which a coupling between the AV sink device and the AV source device remains uninterrupted.

20. The one or more tangible computer-readable storage media of claim 15, wherein the computer process further comprises:
based at least in part on receiving the user input, determining a first encryption setting of the AV sink device;
analyzing the received media stream received from an AV source device to determine a second encryption setting being used by the AV source device to prepare data of the received media stream for transmission to the AV sink device; and
based at least in part on identifying a mismatch between the first encryption setting and the second encryption setting, blocking incoming content of the received media stream from being presented on the display.

* * * * *